United States Patent
Rinker et al.

(10) Patent No.: US 7,378,015 B2
(45) Date of Patent: May 27, 2008

(54) FILTERED WATER ENHANCEMENTS

(75) Inventors: Edward B. Rinker, Oakland, CA (US); Elizabeth Lane, Oakland, CA (US); Simon Litvin, Boston, MA (US); Ilya Ilyin, St. Petersburg (RU); Alexander Chaliyan, St. Petersburg (RU); Dmitry Logatchev, St. Petersburg (RU); Michael Gershman, Zoran (IL)

(73) Assignee: The Clorox Company, Oakland, CA (US)

( * ) Notice: Subject to any disclaimer, the term of this patent is extended or adjusted under 35 U.S.C. 154(b) by 784 days.

(21) Appl. No.: 10/825,344

(22) Filed: Apr. 15, 2004

(65) Prior Publication Data

US 2005/0133427 A1    Jun. 23, 2005

Related U.S. Application Data

(60) Provisional application No. 60/531,004, filed on Dec. 18, 2003.

(51) Int. Cl.
  *B01D 35/00* (2006.01)
(52) U.S. Cl. .................. 210/203; 210/282
(58) Field of Classification Search ......... 210/409, 210/434
  See application file for complete search history.

(56) References Cited

U.S. PATENT DOCUMENTS

| 2,328,110 | A |   | 8/1943  | Thompson et al. |
|-----------|---|---|---------|-----------------|
| 2,502,603 | A |   | 4/1950  | Tanner          |
| 2,502,610 | A |   | 4/1950  | Wegman          |
| 2,631,521 | A |   | 3/1953  | Atkins ................... 99/275 |
| 2,705,091 | A |   | 3/1955  | Marchand ................ 222/129 |
| 2,879,952 | A |   | 3/1959  | Pollitz et al.  |
| 3,255,691 | A |   | 6/1966  | Schwartz ................... 99/275 |
| 3,375,913 | A |   | 4/1968  | Norris, jr.     |
| 3,463,361 | A |   | 8/1969  | Cook et al.     |
| 3,568,887 | A |   | 3/1971  | Jacobs          |
| 3,814,548 | A |   | 6/1974  | Rupp            |
| 3,822,018 | A |   | 7/1974  | Krongos         |
| 4,172,796 | A | * | 10/1979 | Corder .................. 210/238 |
| 4,324,494 | A |   | 4/1982  | Pryor           |
| 4,414,996 | A |   | 11/1983 | Klepa           |
| 4,582,223 | A |   | 4/1986  | Kobe            |

(Continued)

FOREIGN PATENT DOCUMENTS

JP      3-182243    8/1991

(Continued)

*Primary Examiner*—Alexa D. Neckel
*Assistant Examiner*—Imran Akram
(74) *Attorney, Agent, or Firm*—Thomas C. Feix (57) ABSTRACT

A system for enhancing water is described. The system includes a housing with an inlet and an outlet, source water at the inlet, which can flow through a filter component in the housing and thus become treated water, and at least one enhancement module that can dispense an enhancement into the treated water as it flows through the outlet. Water can flow through the system only by the force of gravity, pressure in a building's water line, and/or hand pumps. Enhancement that can be used in the system include flavorings, dyes, minerals, vitamins, herbal supplements, nutritional supplements, phytonutrients, probiotics, homoepathic remedies, amino acids, enzymes, hormones, standard prescription medications, and over-the-counter medications, and combinations thereof. A control is also provided, through which a consumer can regulate an amount of enhancement that is added to the treated water.

23 Claims, 8 Drawing Sheets

U.S. PATENT DOCUMENTS

| | | |
|---|---|---|
| 4,674,657 A | 6/1987 | Daniels |
| 4,759,474 A | 7/1988 | Regunathan |
| 4,860,923 A | 8/1989 | Kirschner et al. |
| 5,045,195 A | 9/1991 | Spangrud |
| 5,076,425 A | 12/1991 | Plone |
| 5,114,048 A | 5/1992 | Minke |
| RE33,969 E | 6/1992 | Richter |
| 5,200,070 A | 4/1993 | McMenamin |
| 5,211,973 A | 5/1993 | Nohren |
| 5,215,659 A | 6/1993 | Ando |
| 5,290,442 A | 3/1994 | Clack |
| 5,328,597 A | 7/1994 | Boldt, Jr. et al. |
| 5,342,518 A | 8/1994 | Posner |
| 5,390,587 A | 2/1995 | Wu |
| 5,399,260 A | 3/1995 | Eldredge et al. |
| 5,427,682 A | 6/1995 | Vogel |
| 5,443,739 A | 8/1995 | Vogel |
| 5,454,944 A | 10/1995 | Clack |
| 5,536,394 A | 7/1996 | Lund |
| 5,560,393 A | 10/1996 | Clack |
| 5,688,397 A | 11/1997 | Malmborg |
| 5,918,768 A | 7/1999 | Ford |
| 5,922,378 A | 7/1999 | Kagan |
| 5,931,343 A | 8/1999 | Topar |
| 5,941,380 A | 8/1999 | Rothman |
| 5,980,959 A | 11/1999 | Frutin |
| 6,024,012 A | 2/2000 | Luzenberg |
| 6,058,718 A | 5/2000 | Forsberg et al. |
| 6,098,795 A | 8/2000 | Mollstam |
| 6,099,735 A | 8/2000 | Kelada |
| 6,221,416 B1 | 4/2001 | Nohren |
| 6,372,270 B1 | 4/2002 | Denny |
| 6,394,312 B1 | 5/2002 | Endou |
| 6,405,900 B1 | 6/2002 | Kown |
| 6,409,099 B1 | 6/2002 | Goodwin |
| 6,419,118 B1 | 7/2002 | Rees |
| 6,423,224 B1 | 7/2002 | Tanner |
| 6,428,689 B1 | 8/2002 | Kameyama et al. |
| 6,461,498 B2 | 10/2002 | Tseng |
| 6,478,192 B2 | 11/2002 | Heyes |
| 6,482,823 B1 | 11/2002 | Yu et al. |
| 6,513,337 B1 | 2/2003 | Astvatsatrian et al. |
| 6,527,109 B2 | 3/2003 | Schoo |
| 6,540,070 B1 | 4/2003 | Conwell |
| 6,569,329 B1 * | 5/2003 | Nohren, Jr. .................. 210/282 |
| 6,672,817 B2 | 1/2004 | Denny |
| 2002/0011434 A1 | 1/2002 | Kuennen et al. |
| 2002/0011437 A1 | 1/2002 | Kaito et al. |
| 2002/0014461 A1 | 2/2002 | Kuennen et al. |
| 2003/0042201 A1 | 3/2003 | Sizelove et al. |
| 2003/0049352 A1 | 3/2003 | Mehansho |
| 2003/0132167 A1 | 7/2003 | Haase |
| 2003/0188740 A1 | 10/2003 | Tribelsky et al. |
| 2003/0234212 A1 | 12/2003 | Ito et al. |
| 2004/0055948 A1 | 3/2004 | Blum |
| 2005/0133427 A1 | 6/2005 | Rinker et al. |
| 2005/0145548 A1 | 7/2005 | Rhoades |
| 2005/0258082 A1 | 11/2005 | Lund et al. |

FOREIGN PATENT DOCUMENTS

| | | |
|---|---|---|
| JP | 07290068 A | 11/1995 |
| WO | WO 99/38395 | 8/1999 |
| WO | WO 03/022401 | 3/2003 |
| WO | WO 03/097478 | 11/2003 |
| WO | WO2004013047 | 2/2004 |
| WO | WO2004026769 A1 | 4/2004 |

* cited by examiner

FILTERED WATER ENHANCEMENTS

CROSS-REFERENCE TO RELATED APPLICATIONS

This application claims priority to U.S. Provisional Application No. 60/531,004, filed Dec. 18, 2003.

BACKGROUND OF THE INVENTION

1. Field of the Invention

This invention relates generally to water filtration, and, more specifically, to systems that add enhancements to filtered drinking water.

2. Description of the Related Art

Unwanted and potentially harmful contamination in water, especially drinking water, is of concern to many people. This concern creates a desire for water treatment devices in the home and elsewhere. Many water treatment devices and methods have been developed to remove or neutralize particulate and chemical contaminants.

Major categories of consumer water filtration systems include plumbed-in or faucet-mount systems that rely on the pressure of the water supply to force untreated water through a water treatment device; and non-plumbed, pour-though or batch systems that rely on gravity to move water from an upper influent water chamber, through a filtering means to a lower effluent water chamber. In general, most pour-through systems use water filters made of loose filtration media, as the force of gravity is not usually enough to push water through more compacted media. On the other hand, most faucet-mount systems filter water through porous composite blocks made from filtration media and binders. Water in faucet-mount systems is driven through filter blocks by pressure in the water supply line. Other water treatment systems that can use porous composite blocks include refrigerator systems and squeeze bottles.

People have greatly increased their consumption of filtered or processed water in recent years. Many people choose filtered water because they like the taste or because they believe it is a healthier option than tap or well water.

There is an increasing demand for dietary supplements, such as vitamins, minerals, and herbs, as part of maintaining overall health. It is desirable, as an outgrowth of water filtration, to offer enhancements to add to filtered water to support the health of consumers. Although enhancements can be purchased separately and added to filtered water, it is inconvenient to have to open a package or several packages to get the mix of enhancements desired. It is even more inconvenient to do this repeatedly for each glass of filtered water, requiring additional time and utensils. Furthermore, it is not very useful to mix up a large batch of filtered, enhanced water, as many enhancements change over time after mixing into water.

Accordingly, there is a need for improved devices and methods for adding enhancements to filtered water.

SUMMARY OF THE INVENTION

In accordance with one aspect of the present invention a system for enhancing water is provided. The system includes a housing with an inlet and an outlet, source water at the inlet, which can flow through a filter component in the housing and thus become treated water, and at least one enhancement module that can dispense an enhancement into the treated water as it flows through the outlet. Water can flow through the system only by the force of gravity, water pressure in a building's water supply line, and/or hand pumps.

Enhancements that can be used in the system include flavorings, dyes, minerals, vitamins, herbal supplements, nutritional supplements, phytonutrients, probiotics, homoeopathic remedies, amino acids, enzymes, hormones, enzymes, hormones, hormones, standard prescription medications, over-the-counter medications, and combinations thereof. A control is also provided, through which a consumer can regulate an amount of enhancement that is added to the treated water.

A method of mixing an enhanced water beverage is also provided.

Further features and advantages of the present invention will become apparent to those of ordinary skill in the art in view of the detailed description of embodiments below, when considered together with the attached drawings and claims.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

There are a number of reasons why health-minded people drink water regularly. Drinking water prevents dehydration, which is associated with fatigue and a variety of health concerns. Water can provide proper hydration, which aids digestion, supports removal of cell waste products, and contributes to skin and overall health. After exercise, water can replenish lost fluids. Many weight loss programs encourage drinking water as a no-calorie stomach filler. In general, water is a much healthier hydration choice than beverages that contain sugar, carbonation, or caffeine. Many people prefer not to drink tap water because of possible contaminants therein and because they do not like the taste. Some people choose filtered water in order to avoid ingestion of contaminants, such as lead and sulfur, and because they prefer the taste of water after filtration.

Many people like the idea of adding supplements or enhancements to their diets because they want to improve or maintain their health. Popular supplements include daily multi-vitamins, minerals, and herbs, which can supply benefits such as increased energy or increased immunity. One of the primary barriers to taking regular supplements is the inconvenience; it can be difficult to make the time to mix beverages or to remember to take pills as part of one's daily routine. It is more convenient when supplements or enhancements are included in beverages or foods that people are already ingesting every day. Examples include calcium-fortified orange juice, milk with added vitamin D, and vitamin-fortified breakfast cereal. But the enhancements are included in the orange juice, the milk and the cereal long before these products reach people's homes. It would be even more convenient if individual enhancements, tailored to individual needs or desires, could be added easily and at the point of use to beverages people are already drinking every day, such as filtered water.

Household pets or other animals can also benefit from enhanced water, especially when the enhancement(s) has been tailored to their individual needs.

In one embodiment of the invention, enhancements can be dispensed as individual doses into filtered water as the filtered water leaves a water treatment system. It is desirable to use simple water treatment systems to minimize cost and complexity to the consumer. Simple water treatment systems include systems through which water is driven by the force of gravity, by pressure in the source water line, and/or by hand pumps. The source water line is generally part of the plumbing in the house or building in which the water treatment system is used. Examples of simple water treatment systems include faucet mount systems, in-faucet systems, under-the-sink systems, countertop systems, refrigerator water systems, stand-alone filtration pitchers, water dispensers, and portable water bottles. Systems that require electric pumps to move water through them or that operate at pressures greater than 125 psi, or, in some arrangements, greater than 100 psi, are not considered to be simple water treatment systems for the purpose of this disclosure.

Not everyone needs or desires the same enhancements. In a situation where many people use the same enhanced water system, specific enhancement(s) can be chosen for each person. A number of enhancements can be stored as part of the water enhancement system and can be dispensed simply, as desired. One or several enhancements can be added to filtered water as it leaves the system.

The amount or dose of an enhancement can be selected for each individual serving. The dose can be adjusted based on the amount of treated water that is added to the enhancement. In some arrangements, the dose can be pre-selected and then dispensed with subsequent servings. In other arrangements, the dose can be determined and dispensed as desired with each serving.

In some embodiments, enhancements are added to filtered water without adding any apparent taste, smell, or feel, that is, the enhancements are organoleptically acceptable. The aesthetic of enhanced water can be indistinguishable from that of filtered water. Health-related enhancements include minerals, vitamins, herbal supplements, nutritional supplements, phytonutrients, probiotics, homoepathic remedies, amino acids, enzymes, hormones, standard prescription medications and over-the-counter medications. Examples of some enhancements are given in Table 1. Enhancements are most useful when they are in forms that have high bioavailability, that is, forms that are easily absorbed and used by the body.

TABLE 1

Health-Related Enhancements

| | |
|---|---|
| minerals | calcium, magnesium, iron, zinc, manganese, copper, chromium, selenium, molybdenum, vanadium, potassium, iodine, pentathionic acid, boron |
| vitamins | vitamin A, vitamin B2, vitamin B6, vitamin B12, vitamin C, vitamin E, niacin, thiamin, omega-3, omega-6, omega-9 fatty acids, folic acid |
| herbal supplements | *echinacea*, primrose oil, ginseng, ginko, gentian, comfrey, garlic, *calendula*, brewer's yeast, fenugreek, licorice root, juniper berry, wild yam root, ginger root, goldenseal root, poke root, St. John's wort, mullein, saw palmetto |
| phytonutrients | *chlorella, spirulina* |
| probiotics | *lactobacillus acidophilus, bifobacterium bifidium* |
| homoepathic remedies | *arnica montana, aconitum napellus, bryonia alba, cantharis, cocculus indicus, dulcamara, gelsemium sempervirens, ignatia amara, ledum palustre, mezereum, nux vomica, silicea, thuja occidentalis* |
| amino acids | histidine, isoleucine, leucine, lysine, methionine, cysteine, phenylalanine, tyrosine, threonine, tryptophan, valine |
| enzymes | pancreatin, bromelain, protease, lipase, amylase, pancrelipase, papain, pepsin, diatase, cellulase |

In other embodiments, it can be advantageous to change the aesthetics of the filtered water using enhancements. Aesthetic enhancements include coloring agents, such as FD&C dyes and FD&C lake dyes; flavoring agents, such as natural and artificial fruit and botanical flavors, fruit juices, and other well-known flavoring agents, such as chocolate and vanilla; edible acids, such as tannic acid, malic acid, tartaric acid, citric acid, phosphoric acid, acetic acid, lactic acid, and maleic acid; natural and artificial sweeteners; and antioxidants, such as butylated hydroxyanisole (BHA) and butylated hydroxytouene (BHT). In some arrangements, aesthetic enhancements can be used to mask an organoleptic change caused by a health-related enhancement. In some arrangements, aesthetic enhancements can be used in addition to health-related enhancements, even when the health-related enhancement has caused no organoleptic change, for example, as an indicator that a particular health-related enhancement has also been added. In other arrangements, aesthetic enhancements can be used by themselves when only an aesthetic change to filtered water is desired.

After they are mixed with water, some enhancements, such as vitamin C, vitamin B, and iron, can degrade over time. The enhancements can lose their potency or they can lose their effectiveness altogether. If the enhanced water is ingested very soon after the enhancement is added, benefits from the enhancement can be realized without concern about degradation.

Some other enhancements, such as calcium, can promote growth of harmful bacteria unless the water and its container have been sterilized before the addition of the enhancement. Under most normal filtered water conditions, it is safer to drink water that contains these enhancements soon after the enhancements are added.

Enhancements can be in the form of liquids, powders, microcapsules, nanocapsules, nebulized nanoparticles, nanoemulsions, micelles, gases, and combinations thereof. In some arrangements, the enhancements are contained in a refillable reservoir. In other arrangements, the enhancements are contained in a disposable cartridge.

Figure 1:
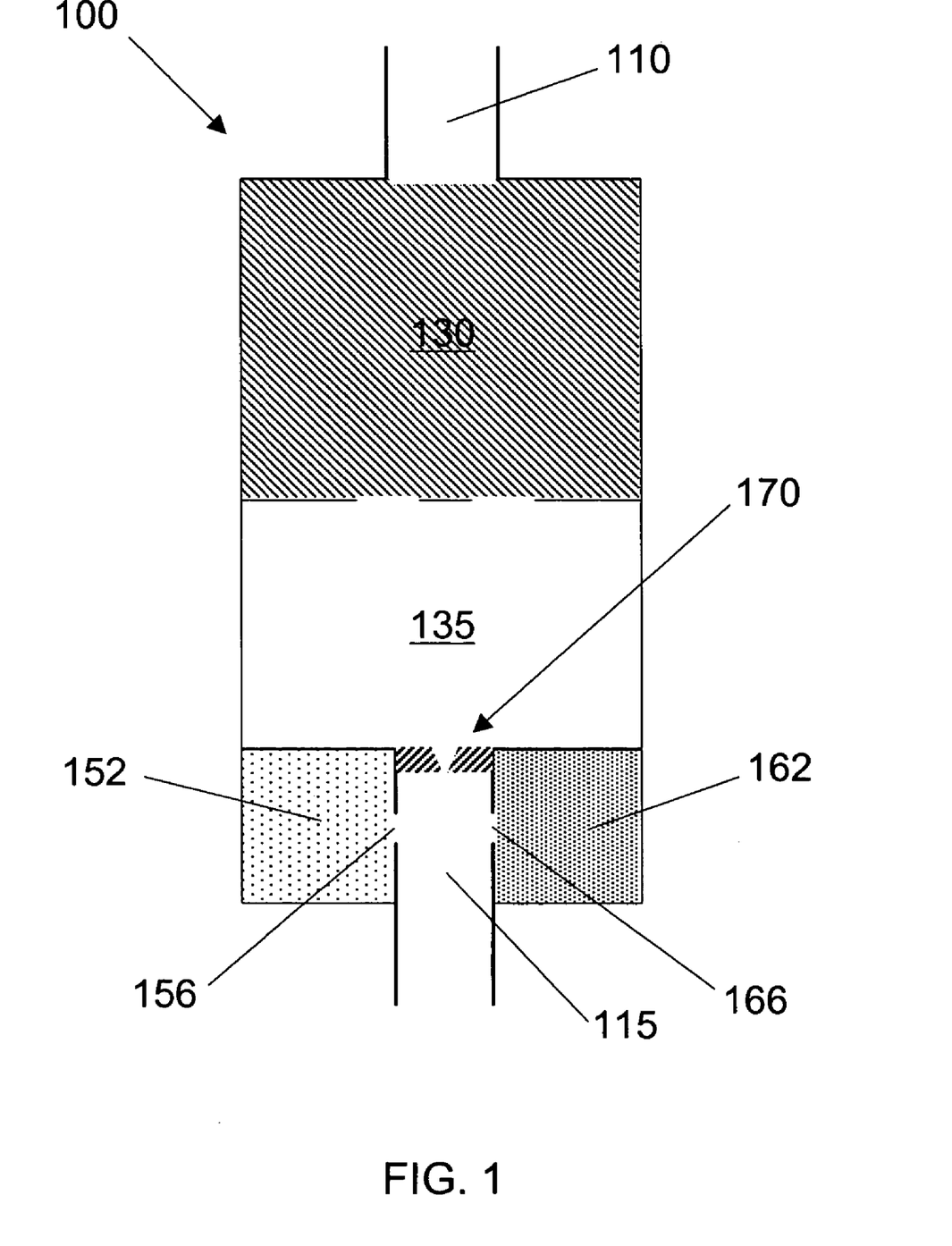
FIG. 1 is a schematic cross-section drawing of a water enhancement system, according to an embodiment of the invention.

FIG. 1 is a schematic cross-section drawing of a water enhancement system 100 that can both filter water and add enhancements to the filtered or treated water, according to an embodiment of the invention. The water enhancement system 100 includes an inlet 110 for source water. The inlet 110 is in fluid communication with a water filter device 130. Source water can flow from the inlet 110 along any of a number of fluid paths through water treatment material within the filter device 130, thus becoming treated water. Possible water treatment materials include activated carbon, carbonized synthetic materials, hydrophobic polymeric adsorbents, activated alumina, activated bauxite, fuller's earth, diatomaceous earth, silica gel, calcium sulfate, zeolite particles, inert particles, sand, surface charge-modified particles, ceramic particles, metal oxides, metal hydroxides, and combinations thereof. The treated water can flow from the filter device 130 into an outlet 115. In some embodiments, the treated water flows from the filter device 130 into a treated water container 135, where the treated water can be held for some time before being allowed to flow into the outlet 115.

A first enhancement 152 can be added to the treated water in the outlet 115 through a first dispensing unit 156. In some arrangements, a second enhancement 162 can be added to the treated water in the outlet 115 through a second dispensing unit 166. In other arrangements (not shown), there can be any number of enhancements added to the treated water. As enhancement(s) 152, 162 are added, the treated water becomes enhanced water. The enhanced water can continue flowing through the outlet 115 to a point of use, such as a cup, a bottle, or even directly into a consumer's mouth.

In some arrangements, there is a valve 170 that can prevent enhanced water in the outlet 115 from moving back toward the filter device 130 or back into the optional treated water container 135. The valve 170 can be a simple mechanical check valve or flap valve. In other arrangements, the valve 170 can be electrically powered, for example, by a battery.

In some arrangements, the outlet 115 can include a mixing chamber (not shown) where the enhanced water can be mixed, perhaps with a agitation tool that has a geometry that can create turbulence, such as a rotor, baffle, screw, or auger, before continuing to flow out through the outlet 115 to a point of use. In some arrangements, the agitation tool can be driven solely by the flow of the water. In other arrangements, the agitation tool can be driven by changing the position of the system 100 or by a spring mechanism. In yet other arrangements, the agitation tool can be electrically powered, such as by a battery.

In some embodiments, no electric pumps are used to pump water through the water enhancement system 100 shown in FIG. 1. In some embodiments, source water comes directly from a faucet. The source water is subject to the pressure that results from pumping within a city water system and/or additional pumping systems within a building before the source water reaches the faucet. In other embodiments, there is an inlet water container, as will be discussed below, in which source water can be held before it flows into the filter device 120 under the force of gravity alone.

Figure 2:
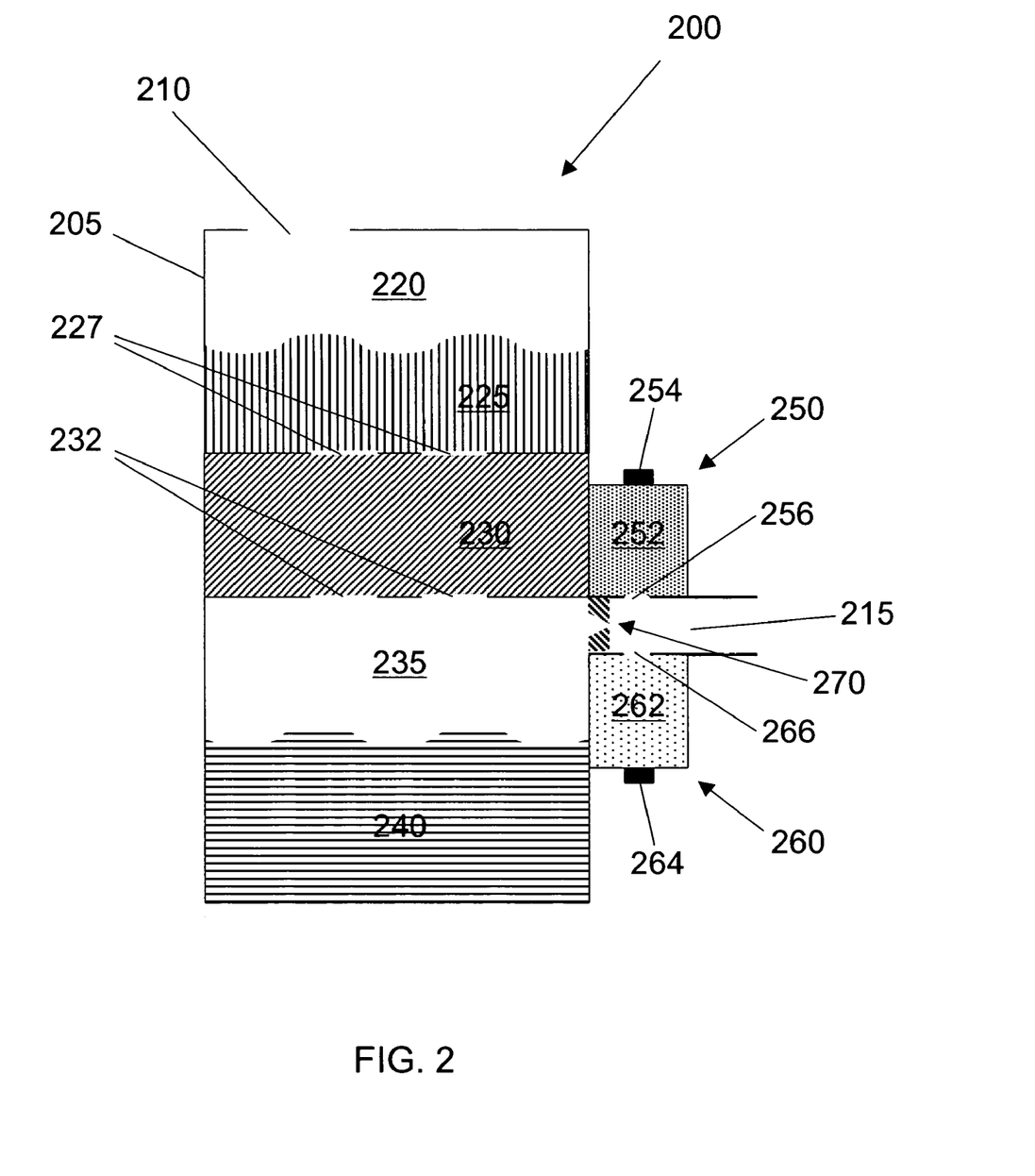
FIG. 2 is a schematic, cross-section drawing of a flow-through or gravity-flow water enhancement system, according to an embodiment of the invention.

FIG. 2 is a schematic, cross-section drawing of a flow-through or gravity-flow water enhancement system 200, according to an embodiment of the invention. No electric pumps are used to move water through the water enhancement system 200. The water enhancement system 200 has a housing 205, which has an inlet 210 and an outlet 215. The inlet 210 opens into a source water container 220. In FIG. 2, the source water container 220 holds a quantity of source water 225, which has been introduced into the source water container 220 through the inlet 210. The source water 225 has fluid communication with a filter component 230 through openings 227. The source water 225 can flow through the filter component 230, thus becoming treated water, and into treated water container 235 through openings 232. In FIG. 2, the treated water container 235 holds a quantity of treated water 240. The outlet 215 can be in fluid communication with the treated water container 235. By adjusting the position of the water enhancement system 200, the treated water 240 can flow into the outlet 215.

Adjacent the outlet 215 is a first enhancement module 250, which contains a first enhancement 252. By activating first consumer control 254, the first enhancement 252 can be dispensed into the outlet 215 through first dispensing unit 256. The first consumer control 254 can be a button, a knob, a dial, a lever, an airbladder, a slide, a catch, a wheel, or combinations thereof.

In FIG. 2, there is a second enhancement module 260 that contains a second enhancement 262 adjacent the outlet 215. By activating second consumer control 264, the second enhancement 262 can be dispensed into the outlet 215 through second dispensing unit 266. Although there are only two enhancement modules 250, 260 shown in FIG. 2, any number of enhancement modules can be used in the embodiments of the invention.

In some arrangements, there is a valve 270 that can prevent enhanced water in the outlet 215 from moving back into the treated water container 235. The valve 270 can be a simple mechanical check valve or flap valve. In other arrangements, the valve 270 can be electrically powered, for example, by a battery. The valve 270 prevents mixing of enhanced water with treated water 240 in the treated water container 235. In some arrangements, the outlet 215 can include a mixing chamber, as is discussed below, where the enhanced water can be mixed before flowing out through the outlet 215 to a point use.

Figure 3A:
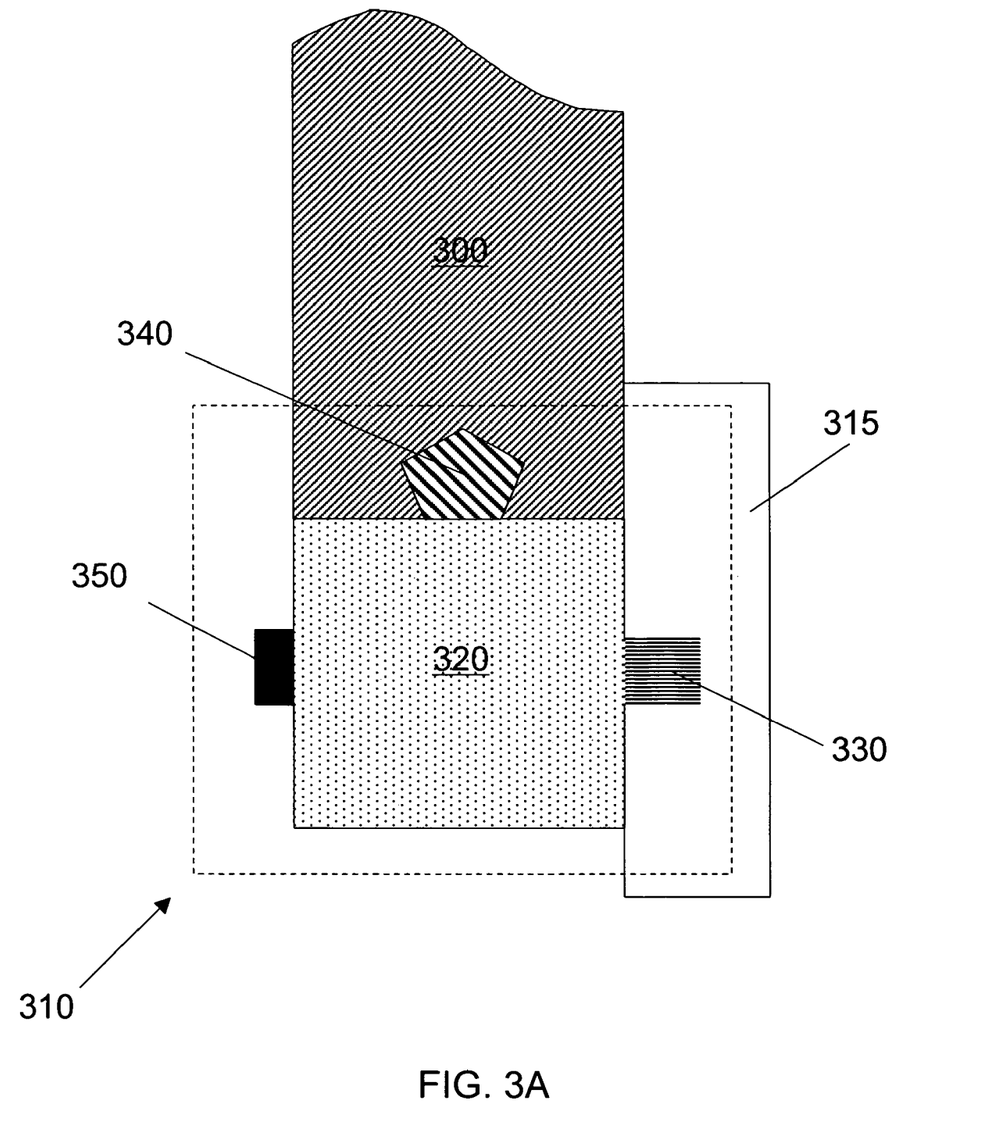
FIG. 3A is a schematic drawing of an enhancement module for a water enhancement system, according to an embodiment of the invention.

FIG. 3A is a schematic drawing of an enhancement module 310 for a water enhancement system 300 (shown partially). In one embodiment, the enhancement module 310 includes a reservoir 320 that can store enhancement material, a dispensing unit 330 to dispense enhancement material from the reservoir 320 to an outlet 315 of the water enhancement system, an attachment portion 340 with which the module 310 can attach to the water enhancement system 300 near the outlet 315, and a consumer control 350 that can act upon the reservoir 320 to release enhancement material into the dispensing unit 330. The consumer control 350 can be a button, a knob, a dial, a lever, an airbladder, a slide, a catch, a wheel, and combinations thereof. The consumer control 350 activates a mechanism that moves the enhancement material from the reservoir 320 out through the dispensing unit 330. The mechanism can be mechanical, electrical, magnetic, or combinations thereof. In some arrangements, the consumer can select an amount, or dose, of enhancement at the time of dispensing. In other arrangements, the mechanism can automatically move a preset dose of enhancement material from the reservoir 320 when the consumer control 350 is activated.

In some arrangements, all components of the enhancement module 310 are integral parts of the water treatment system. The reservoir 320 can be filled with enhancement material multiple times. Various enhancement materials can be introduced into the reservoir 320 as desired. For each enhancement material, the same dispensing unit 330 and consumer control 350 can be used.

The amount or dose of an enhancement can be selected for each individual serving. The dose can be adjusted based on the amount of enhancement desired and on the amount of treated water that is added to the enhancement, i.e., the serving size. In some arrangements, a measured dose can be pre-selected and then automatically dispensed with subsequent servings by activating the consumer control 350. In other arrangements, a measured dose can be selected and dispensed as desired with each serving. Examples of enhancements that can be used in the enhancement module 310 are described above in Table 1. Possible forms for the enhancements include liquids, powders, microcapsules, nanocapsules, nebulized nanoparticles, nanoemulsions, micelles, gases, and combinations thereof.

In other arrangements, an enhancement module 310' (not shown) can be used with a disposable cartridge. The enhancement module 310' can contain fewer components than are shown in FIG. 3A for module 310, as some or all of the components can be included in the disposable cartridge. FIGS. 3B, 3C, 3D, 3E show exemplary embodiments of disposable cartridges that include various components.

Figure 3B:
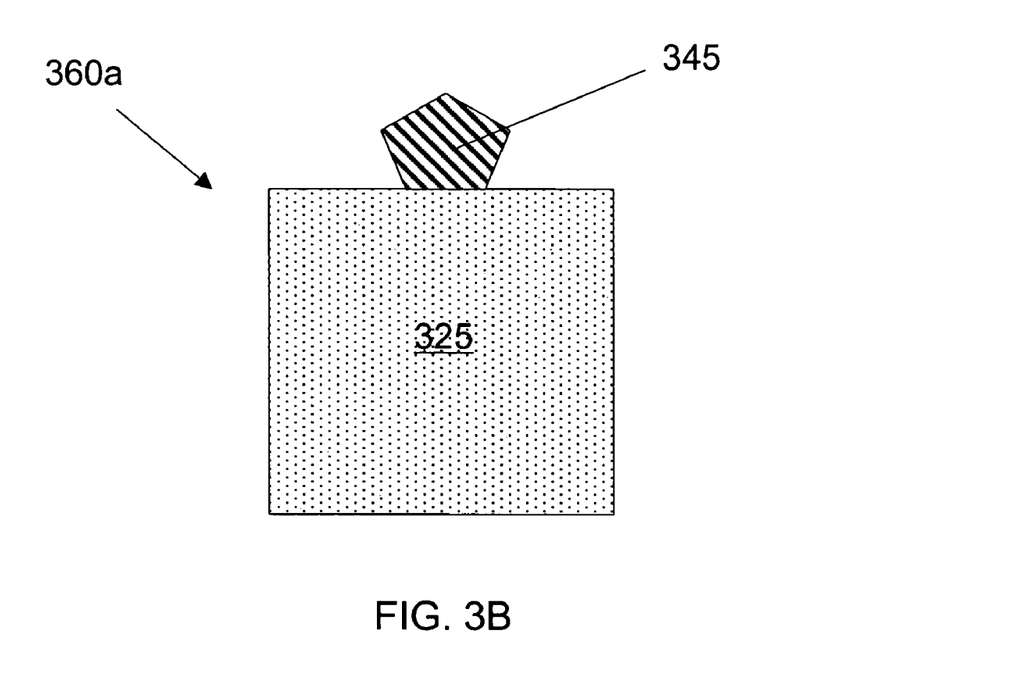
FIG. 3B is a schematic drawing of an enhancement cartridge for a water enhancement system, according to an embodiment of the invention.

FIG. 3B shows a very simple disposable cartridge 360a. The cartridge 360a includes a reservoir 325 and an attachment portion 345 for removably attaching the cartridge 360a to a water treatment system. The cartridge 360a can be used with an enhancement module that includes both a consumer control 350 and a dispensing unit 330 as part of the module (see FIG. 3).

Figure 3C:
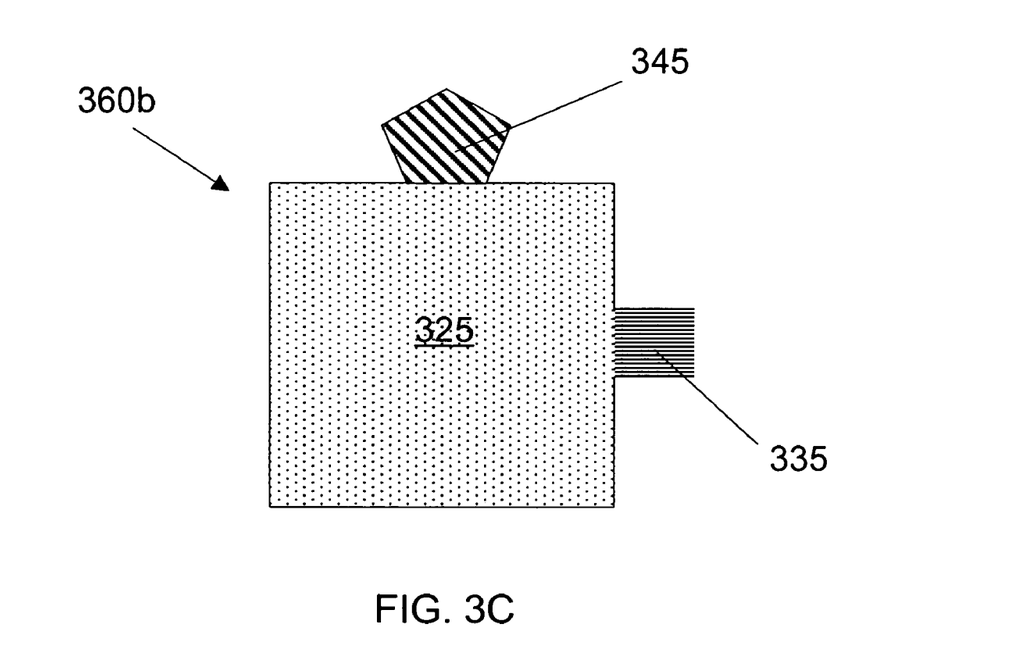
FIG. 3C is a schematic drawing of an enhancement cartridge for a water enhancement system, according to another embodiment of the invention.

FIG. 3C shows a disposable cartridge 360b. The cartridge 360b includes a reservoir 325 and an attachment portion 345 for removably attaching the cartridge 360b to a water treatment system. The cartridge 360b includes a dispensing unit 335. The disposable cartridge 310b can be useful especially when clogging of dispensing unit 330 in enhancement module 310 is a concern. Instead of re-using the dispensing unit 330 that is part of the enhancement module 310, a new, unused dispensing unit 335 is part of each new cartridge 360b. The cartridge 360b can be used with an enhancement module that includes a consumer control 350 as part of the module (see FIG. 3).

Figure 3D:
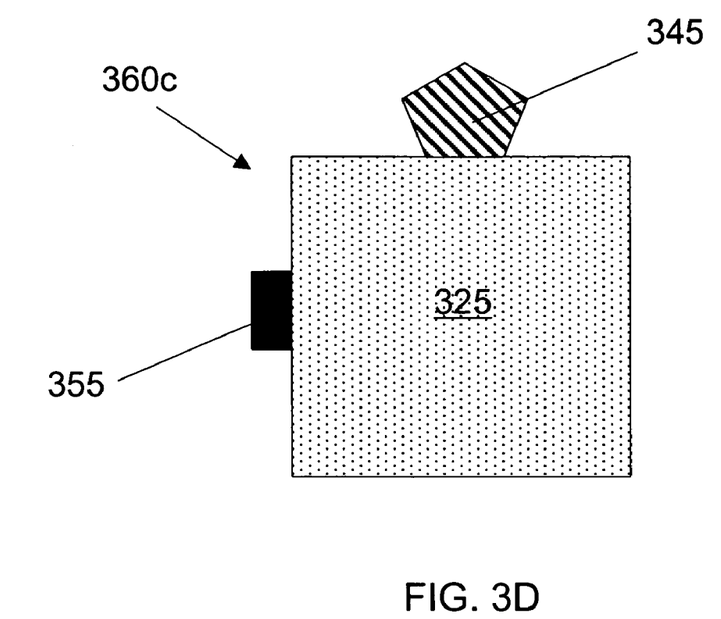
FIG. 3D is a schematic drawing of an enhancement cartridge for a water enhancement system, according to yet another embodiment of the invention.

FIG. 3D shows a disposable cartridge 360c. The cartridge 360c includes a reservoir 325 and an attachment portion 345 for removably attaching the cartridge 360c to a water treatment system. The cartridge 360c includes a consumer control 355, but not a dispensing unit 335. Cartridge 360c can be useful especially when wearing out of consumer control 350 on enhancement module 310 is a concern. Cartridge 360c is useful also when the form of the reservoir 325 or the form of the enhancement in the reservoir 325 calls for a particular type of consumer control 355. The cartridge 360c can be used with an enhancement module that includes a dispensing unit 330 as part of the module (see FIG. 3).

Figure 3E:
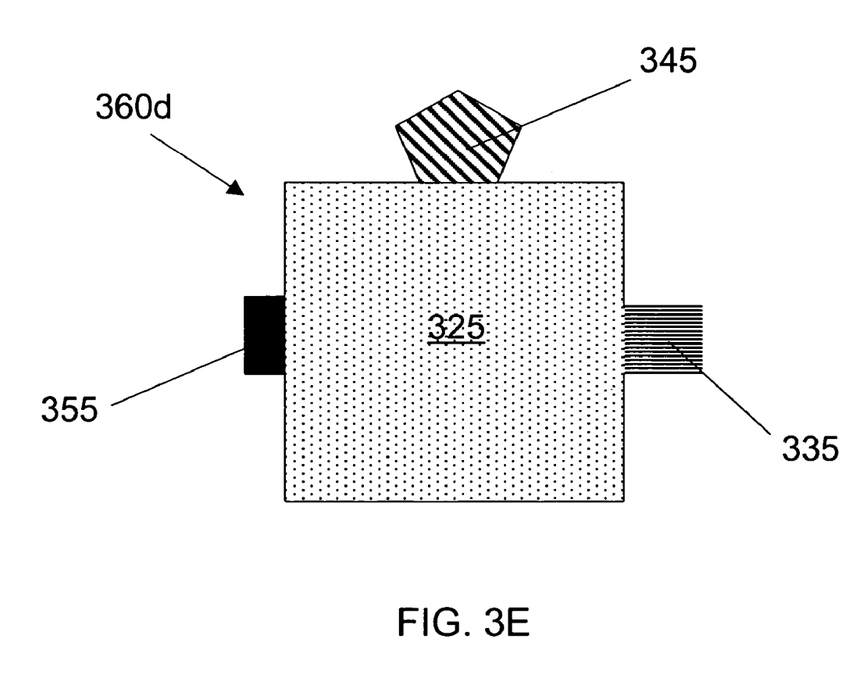
FIG. 3E is a schematic drawing of an enhancement cartridge for a water enhancement system, according to yet another embodiment of the invention.

FIG. 3E shows a disposable cartridge 360d. The cartridge 360d includes a reservoir 325 and an attachment portion 345 for removably attaching the cartridge 360d to a water treatment system. The cartridge 360d includes both a dispensing unit 335 and a consumer control 355. As for cartridge 360b, the cartridge 360d can be useful when clogging of dispensing unit 330 on enhancement module 310 is a concern. Instead of re-using the dispensing unit that is part of the enhancement module 310, a new, unused dispensing unit 335 is part of each new cartridge 360d. Cartridge 360d can be useful especially when wearing out of consumer control 350 on enhancement module 310 is a concern. As for cartridge 360c, cartridge 360d is useful also when the form of the reservoir 325 or the form of the enhancement in the reservoir 325 calls for a particular type of consumer control 355. The cartridge 360d can be used with an enhancement module that includes neither a consumer control 350 nor a dispensing unit 330 as part of the module (see FIG. 3).

Figure 4A:
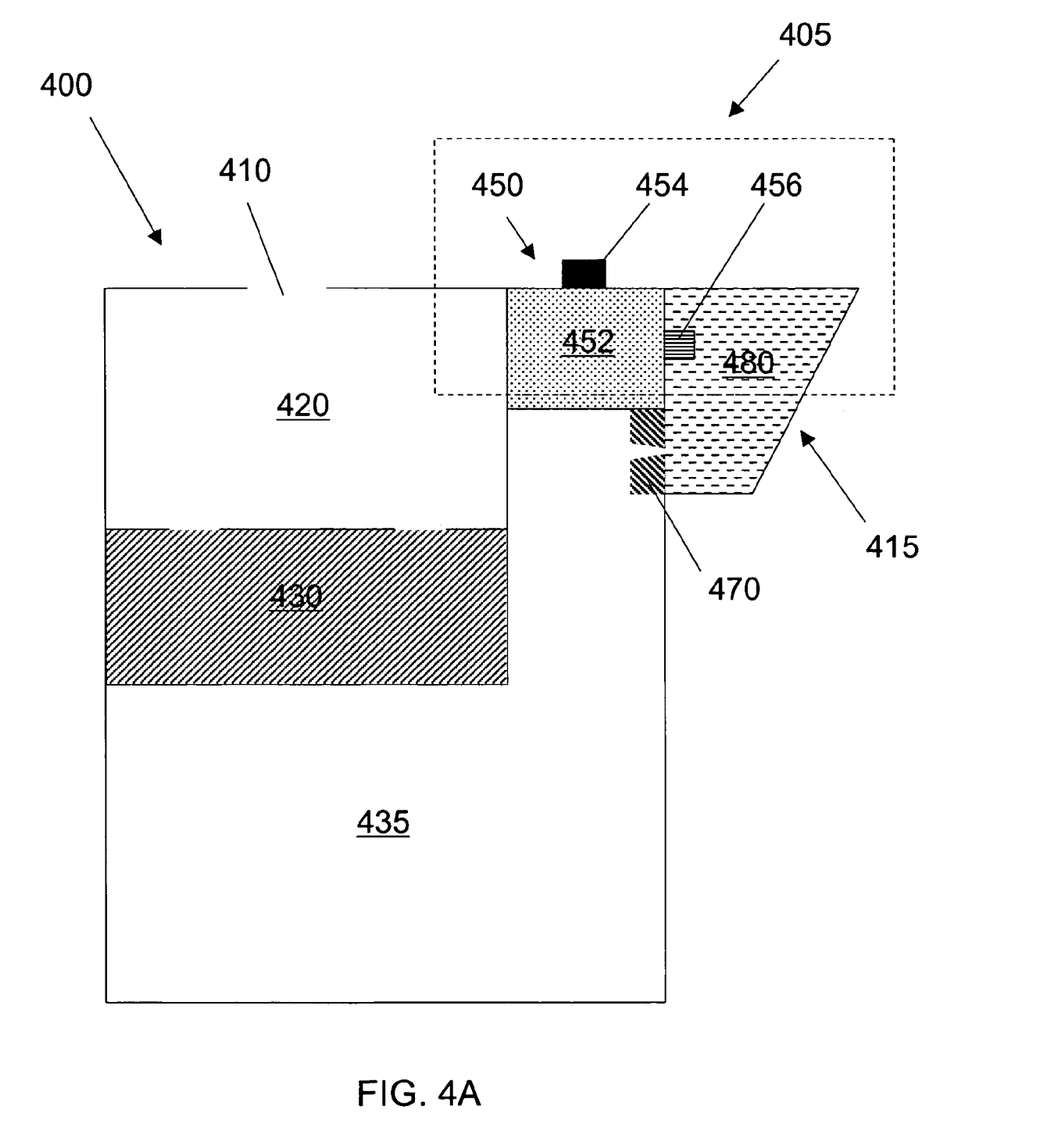
FIG. 4A is a schematic side view of a flow-through or gravity-flow water enhancement system according to an embodiment of the invention.

FIG. 4A is a schematic side view of a flow-through or gravity-flow water enhancement system 400 according to an embodiment of the invention. The system 400 has many of the same features as the system 200 shown in FIG. 2. No electric pumps are used to move water through the water enhancement system 400 shown in FIG. 4A. In some arrangements, a hand-powered pump can be used. An inlet 410 opens into a source water container 420. Source water (not shown) can flow through the filter component 430, thus becoming treated water, and the treated water can flow into the treated water container 435. The system 400 has an outlet 415 that includes an outlet chamber 480.

Adjacent the outlet 415 is a first enhancement module 450, which contains a first enhancement 452. By activating consumer control 454, the first enhancement 452 can be dispensed into the outlet chamber 480 through first dispensing unit 456. In some arrangements, the first consumer control 454 activates a pre-set, automatic dispensing mechanism. In other arrangements, the first consumer control 454 can be adjusted to dispense an individually determined dose of the first enhancement for each serving. Consumer controls have been discussed in detail above with respect to FIG. 3A.

In some arrangements, there is a valve 470 that can prevent enhanced water in the outlet 415 from moving back into the treated water container 435, where the enhanced water could mix with any treated water therein. The valve 470 can be a simple mechanical check valve or flap valve. In other arrangements, the valve 470 can be electrically powered, for example, by a battery. Outlet region 405 is shown in a top view in FIG. 4B.

Figure 4B:
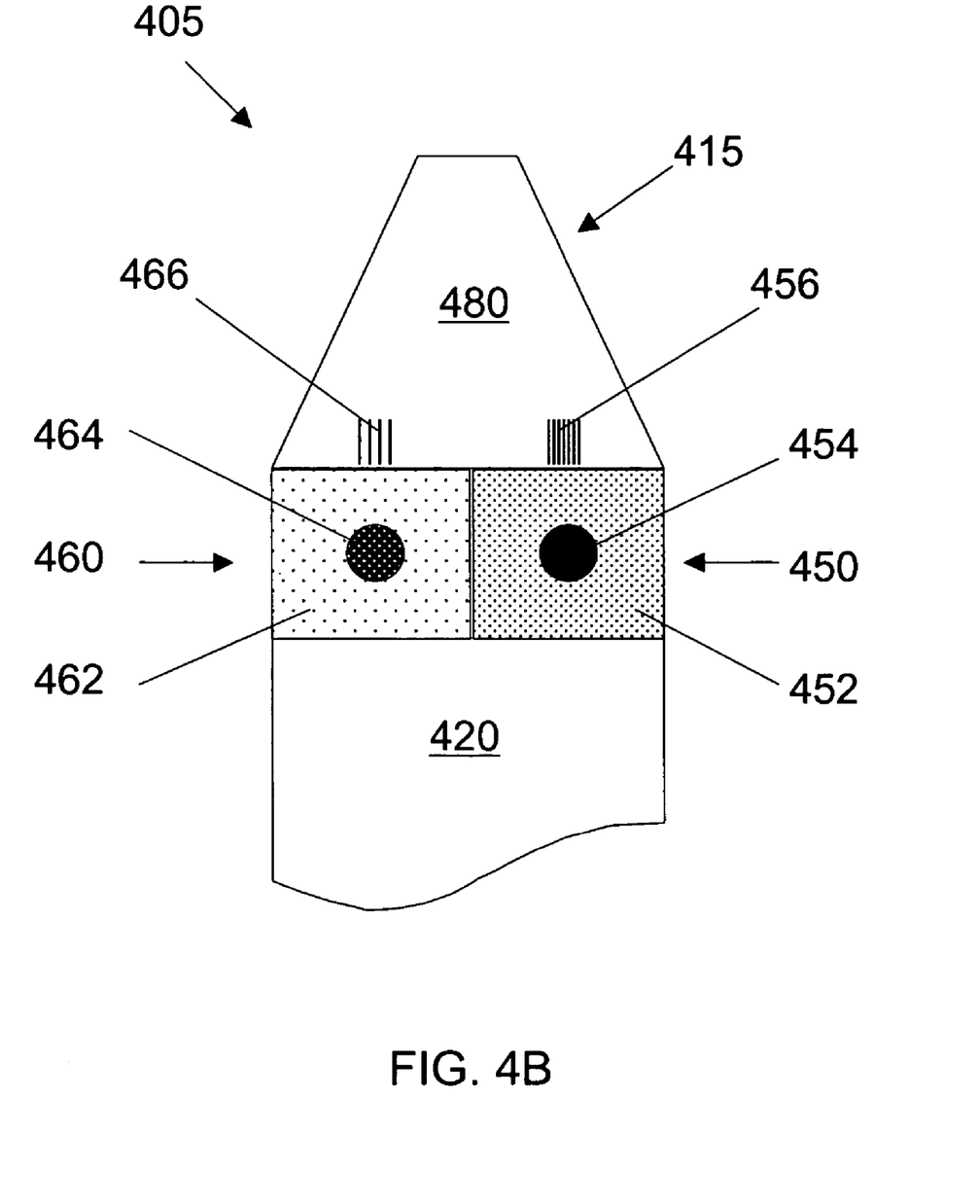
FIG. 4B is an expanded top view of the outlet region shown in FIG. 4A.

In FIG. 4B, a second enhancement module 460 adjacent the outlet 415 is in view. By activating second consumer control 464, a second enhancement 462 can be dispensed into the outlet chamber 480 through second dispensing unit 466. Any number of enhancement modules can be used in the embodiments of the invention. In some arrangements, outlet chamber 480 has a transparent or translucent top covering (not shown) so that the contents of outlet chamber 480 are visible. In other arrangements, there is no top covering on outlet chamber 480. In some arrangements, enhancements 452, 462 can be dispensed through dispensing units 456, 466, respectively, into chamber 480 before treated water is added. A consumer can have visual evidence that the enhancements 452, 462 have been dispensed. Subsequently the position of the water enhancement system 400 can be adjusted to allow treated water to flow into the outlet chamber 480. In some arrangements, it can be desirable to allow the treated water and the enhancements to mix together in the chamber 480 before continuing through the outlet 415 to a point of use, such as a cup, a bottle, or a consumer's mouth.

In some arrangements, there is an agitation tool (not shown) that has a geometry that can create turbulence, such as a rotor, baffle, screw, or auger, in the outlet chamber 480. The agitation tool can aid in mixing the enhancements with the treated water. In some arrangements, the agitation tool can be driven solely by the flow of the water. In other arrangements, the agitation tool can be driven by changing the position of the system or by a spring mechanism. In yet other arrangements, the agitation tool can be electrically powered, such as by a battery.

Figure 5:
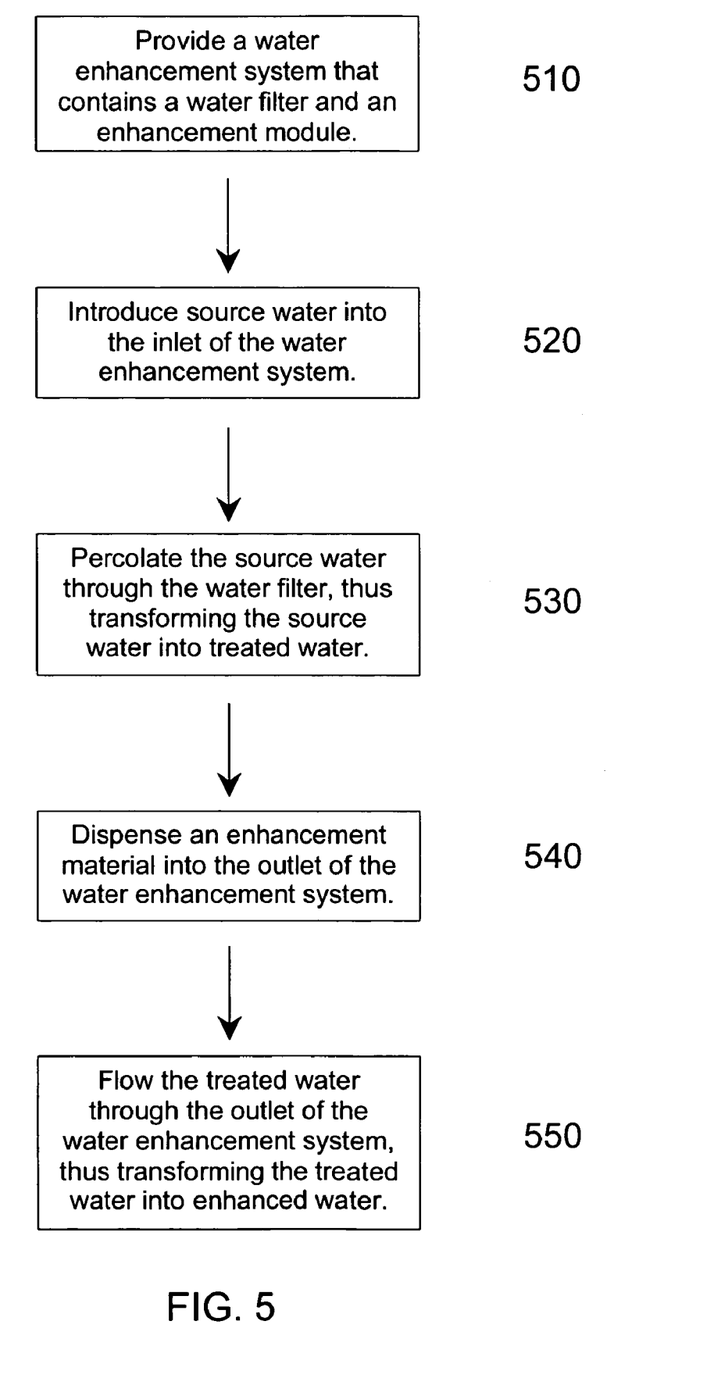
FIG. 5 shows an outline of the steps in a method of mixing an enhanced water beverage, according to an embodiment of the invention.

FIG. 5 shows an outline of the steps in a method of mixing an enhanced water beverage, according to an embodiment of the invention. In step 510, a water enhancement system is provided. The water enhancement system contains a water filter component. The water enhancement system does not include an electric water pump for moving water through the system. The force of gravity, pressure in a water supply line, and/or hand pumps are relied upon to move water through the system. In step 520, source water is introduced into the inlet of the water enhancement system. In step 530, the source water is percolated through the water filter, thus transforming the source water into treated water. Percolate is used here to mean to pass through a porous substance either under the force of gravity or under an imposed pressure. Thus in step 530, the source water passes through the water filter under the force of gravity or driven by pressure from a source water line. In some arrangements, a hand pump can be used to drive the source water, but no electrical pumps are used. In step 540, an enhancement material is dispensed into the outlet of the water enhancement system. In step 550, the treated water is flowed through the outlet of the water enhancement system, thus transforming the treated water into an enhanced water beverage.

The source water can come directly from a water faucet or a water supply line, or it can be held first in a source water container before percolating through the water filter. The water filter includes activated carbon and can include other water treatment materials as have been discussed above. In some arrangements, flowing the treated water through the outlet can involve adjusting the position of the water enhancement system to pour the treated water out through the outlet.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A system for enhancing water, comprising:
a housing including a source water container having an inlet and a treated water container having an outlet;
source water capable of being in fluid communication with the inlet and the outlet;
a filter component within the housing, the filter component containing water treatment material, and the filter component capable of having fluid communication with the inlet;
a fluid path within the water treatment material wherein the source water can flow along the fluid path and be treated by the water treatment material, thereby converting the source water to treated water, the treated water capable of being in fluid communication with the outlet; and
a first enhancement module disposed outside the housing adjacent the outlet such that the first enhancement module is downstream and spaced apart from the filter, and said first enhancement module is capable of dispensing a first enhancement into a stream of treated water upon exiting the outlet;
a first consumer control, whereby a consumer can regulate an amount of the first enhancement that is dispensed into the outlet; and
wherein water flow in the system is driven solely by a force selected from the group consisting of gravity, pressure from a source water line, pressure from a hand pump, and combinations thereof.

2. The system of claim 1 wherein the system is a gravity flow system selected from the group consisting of stand-alone filtration pitchers, countertop systems, water dispensers, and portable water bottles.

3. The system of claim 1 wherein the water treatment material is selected from the group consisting of activated carbon, carbonized synthetic materials, hydrophobic polymeric adsorbents, activated alumina, activated bauxite, fuller's earth, diatomaceous earth, silica gel, calcium sulfate, zeolite particles, inert particles, sand, surface charge-modified particles, ceramic particles, metal oxides, metal hydroxides, and combinations thereof.

4. The system of claim 1, further comprising a valve adjacent the outlet, the valve capable of preventing enhanced water from flowing from the outlet toward the filter component.

5. The system of claim 1, further comprising a chamber as a component of the outlet whereby the treated water and the first enhancement can be mixed together in the chamber before exiting the system.

6. The system of claim 5 wherein the chamber comprises an agitation tool to augment mixing of the treated water and the first enhancement.

7. The system of claim 6 wherein the agitation tool is selected from the group consisting of rotors, baffles, screws, and augers.

8. The system of claim 1 wherein the first enhancement is selected from the group consisting of flavorings, dyes, minerals, vitamins, herbal supplements, nutritional supplements, phytonutrients, probiotics, homeopathic remedies, amino acids, enzymes, hormones, standard prescription medications, over-the-counter medications, and combinations thereof.

9. The system of claim 1, further comprising a second enhancement module adjoining the outlet and capable of dispensing a second enhancement into the treated water as the treated water flows through the outlet.

10. The system of claim 9, further comprising a second consumer control, whereby a consumer can regulate an amount of the second enhancement that is dispensed into the outlet.

11. The system of claim 1 wherein the source water and the treated water are maintained at pressures less than about 125 psi throughout the system.

12. The system of claim 11 wherein the source water and the treated water are maintained at pressures less than about 100 psi throughout the system.

13. A system for enhancing water, comprising:
a housing including a source water container having an inlet and a treated water container having an outlet;
source water capable of being in fluid communication with the inlet and the outlet;
a filter component within the housing, the filter component containing water treatment material, and the filter component capable of having fluid communication with the inlet;
a fluid path within the water treatment material wherein the source water can flow along the fluid path and be treated by the water treatment material, thereby converting the source water to treated water, the treated water capable of being in fluid communication with the outlet; and
a first enhancement module disposed outside the housing adjacent the outlet such that the first enhancement module is downstream and spaced apart from the filter, and said first enhancement module is capable of dispensing a first enhancement into a stream of treated water upon exiting the outlet;
a first consumer control, whereby a consumer can regulate an amount of the first enhancement that is dispensed into the outlet;
wherein said housing is free of a mixing chamber; and
wherein the system contains no electrically powered water pumps.

14. The system of claim 13, further comprising a valve adjacent the outlet, the valve capable of preventing enhanced water from flowing from the outlet toward the filter component.

15. The system of claim 13, further comprising a chamber as a component of the outlet wherein the treated water and the first enhancement can be mixed together in the chamber before exiting the system.

16. A system for enhancing water, comprising:
a housing including a source water container having an inlet and a treated water container having an outlet;
source water capable of being in fluid communication with the inlet and the outlet;
a filter component within the housing, the filter component containing water treatment material and the filter component capable of having fluid communication with the source water;
a fluid path within the water treatment material wherein the source water can flow along the fluid path and be treated by the water treatment material, thereby converting the source water to treated water, the treated water capable of being in fluid communication with the outlet; and
a first enhancement module disposed outside the housing adjacent the outlet such that the first enhancement module is downstream and spaced apart from the filter, and said first enhancement module is capable of dispensing a first enhancement into a stream of treated water upon exiting the outlet;
a first consumer control, whereby a consumer can regulate an amount of the first enhancement that is dispensed into the outlet;
wherein said housing is free of a mixing chamber; and
wherein the source water and the treated water are maintained at pressures less than about 125 psi throughout the system.

17. The system of claim 16 wherein the source water and the treated water are maintained at pressures less than about 100 psi throughout the system.

18. The system of claim 16, further comprising a valve adjacent the outlet, the valve capable of preventing enhanced water from flowing from the outlet toward the filter component.

19. The system of claim 16, further comprising a chamber as a component of the outlet wherein the treated water and the first enhancement can be mixed together in the chamber before exiting the system.

20. The system of claim 1, wherein said housing is free of a mixing chamber.

21. A gravity-flow water enhancement system, comprising:
a housing including a source water container having an inlet for receiving source water and a treated water container for storing treated water;
a filter component within the housing and in fluid communication with both the source water container and the treated water container, wherein source water introduced to the source water container is converted into treated water as it flows through the filter component under the influence of gravity;
the housing farther including an outlet in fluid communication with the treated water container for outflow of a stream of treated water; and
a first enhancement module disposed outside the housing adjacent the outlet, the first enhancement module being effective to dispense a desired amount of a first enhancement into an outflow stream of treated water.

22. The system of claim 21 further comprising a first consumer control, whereby a consumer can regulate an amount of the first enhancement that is dispensed into the outlet.

23. The system of claim 22, wherein the housing is free of a mixing chamber.

* * * * *